Figure 1:
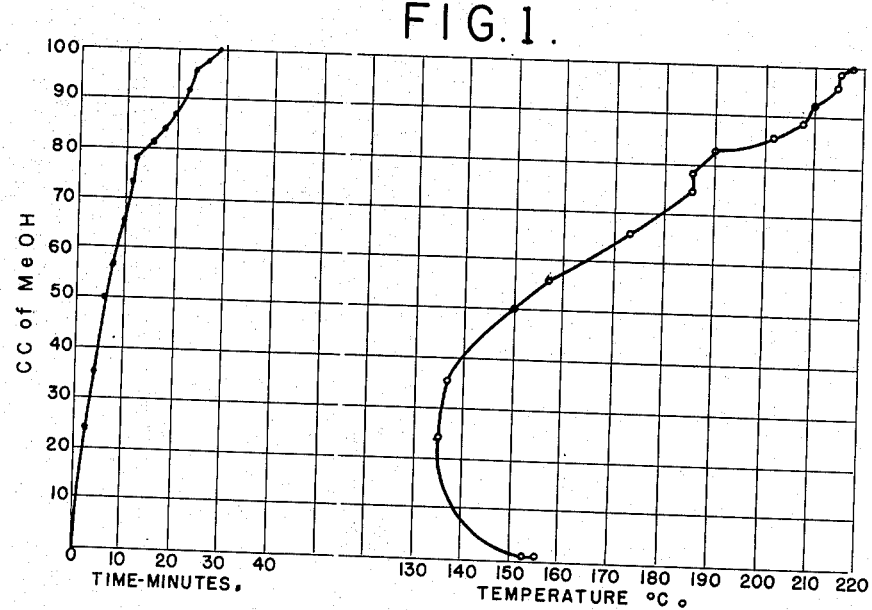

June 15, 1954            J. L. VODONIK            2,681,360
MIXED LITHIUM HYDRIDE-METAL ORGANIC CARBOXYLATE SALT
CATALYSTS FOR ESTER INTERCHANGE REACTION AND PROCESS
Filed Sept. 28, 1951            9 Sheets-Sheet 1

INVENTOR:
JOSEPH L. VODONIK
BY
ATTORNEY.

INVENTOR:
JOSEPH L. VODONIK
BY
ATTORNEY.

FIG. II.

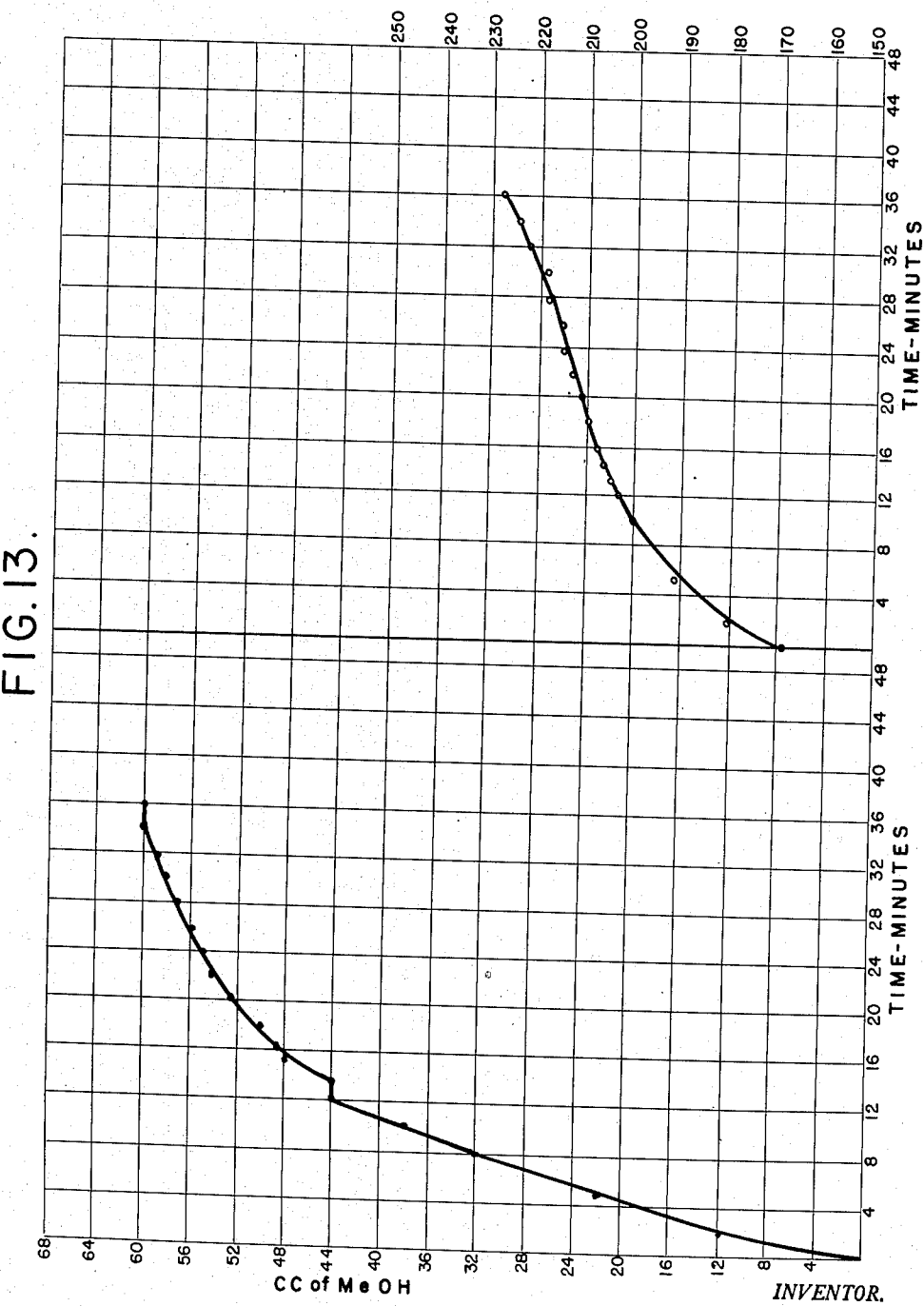

Patented June 15, 1954

2,681,360

UNITED STATES PATENT OFFICE 2,681,360

MIXED LITHIUM HYDRIDE-METAL ORGANIC CARBOXYLATE SALT CATALYSTS FOR ESTER INTERCHANGE REACTION AND PROCESS

Joseph L. Vodonik, Kenmore, N. Y., assignor to E. I. du Pont de Nemours and Company, Wilmington, Del., a corporation of Delaware Application September 28, 1951, Serial No. 248,708

9 Claims. (Cl. 260—475)

This invention relates to an improved process for preparing a synthetic film- and fiber-forming synthetic linear polyester, and more particularly to a process of preparing monomeric glycol terephthalates by an ester interchange reaction between a glycol and a dialkyl ester of terephthalic acid.

The production of the novel class of film- and fiber-forming linear polyesters of terephthalic acid and a glycol of the series $HO(CH_2)_nOH$ wherein "$n$" is an integer from 2 to 10 inclusive, is fully described in U. S. P. 2,465,319 to Whinfield and Dickson. From a commercial standpoint, one of the most attractive polymers of this class is polyethylene terephthalate; and the most promising process for its production comprises carrying out an ester interchange between ethylene glycol and dimethyl terephthalate to form bis-2-hydroxy-ethyl terephthalate monomer which is polymerized to polyethylene terephthalate under reduced pressure and at an elevated temperature.

An object of the present invention is to effectively accelerate the ester interchange reaction between a glycol, such as ethylene glycol, and a lower alkyl ester of terephthalic acid, such as dimethyl terephthalate, whereby to provide for the efficient and economical production of a linear polyester-forming bis-hydroxy alkyl terephthalate.

Another object is to provide a novel combination of catalyst for accelerating ester-interchange between a glycol and a lower alkyl ester of terephthalic acid.

Still another object is to provide an improved process for preparing bis-2-hydroxy-ethyl terephthalate. These and other objects will more clearly appear hereinafter.

The stated objects are realized by the present invention which, briefly stated, comprises reacting a glycol and a lower alkyl ester of terephthalic acid at a temperature of from about 110° C. to about 260° C., and at atmospheric pressure, in the presence of catalytic amounts of a catalyst consisting of lithium hydride and at least one glycol-soluble organic salt of a metal from the group, cadmium, magnesium and zinc.

In more specific form, the ester-interchange catalysts employed in combination with lithium hydride are glycol-soluble monocarboxylic acid salts of metals from the group consisting of cadmium, magnesium and zinc. Those catalysts which are preferred are the cadmium, magnesium and zinc salts of acetic acid. In addition to these preferred glycol-soluble salts, there may be mentioned as suitable for purposes of this invention, the cadmium, magnesium and zinc salts of various other monocarboxylic acids, such as propionic, butyric, valeric, stearic, lauric and others, including those containing up to 18 carbon atoms. Also included within the scope of the present invention are other glycol-soluble cadmium, magnesium and zinc salts such as cadmium salicylate, zinc lactate, zinc salicylate, etc.

The term, "glycol-soluble," employed herein to define the organic salts of metals from the group, cadmium, magnesium and zinc, applies to those salts which are soluble in glycols of the series $HO(CH_2)_nOH$, where "$n$" is an integer within the range of 2 to 10 inclusive, in catalytic quantities, that is, up to about 0.1%, based upon the weight of dialkyl terephthalate, i. e., dimethyl terephthalate. Most of the salts defined herein are soluble in cold, i. e., room temperature, glycol; but the term, "glycol-soluble," is meant to include solubility in hot glycol, i. e., temperatures up to 140°–150° C. These soluble salts are known generally as homogeneous catalysts because their solubility in the glycol provides for a homogeneous system as contrasted to a heterogeneous catalyst which is not soluble and thereby forms a heterogeneous system.

My invention will hereinafter be specifically described with respect to the preparation of bis-2-hydroxyethyl terephthalate monomer by an ester interchange reaction between ethylene glycol and dimethyl terephthalate, which process constitutes the preferred process embodiment of my invention. The invention, however, is applicable, in general, to the preparation of other monomeric glycol terephthalates by conducting an ester interchange reaction between various other glycols of the series $HO(CH_2)_nOH$, where "$n$" is an integer within the range of 2 to 10 inclusive, and various other alkyl terephthalates, i. e., terephthalate esters of saturated aliphatic monohydric alcohols containing up to and including four carbon atoms, e. g., diethyl, dipropyl and di-isobutyl terephthalates. Various specific glycols include trimethylene glycol, tetramethylene glycol, pentamethylene glycol, hexamethylene glycol, heptamethylene glycol, octamethylene glycol, etc. The catalysts of the present invention may also be employed in carrying out ester interchange reactions between mixtures of different esters and at least one polymethylene glycol or polyethylene glycol. For example, a mixture of dimethyl terephthalate, dimethyl sebacate and ethylene glycol may be reacted together to form the mixed esters which, in turn, may be polymerized to form a linear copolyester. Ester interchange reactions of this type are illustrated in United States Patents Numbers 2,623,031 and 2,623,033 in the name of Mark D. Snyder.

In general, based upon the weight of the alkyl terephthalate, e. g., dimethyl terephthalate, lithium hydride concentrations between about 0.003% and about 0.05% are effective. In amounts less than about 0.003%, the operation is too slow for commercial operation. Hydride concentrations greater than about 0.03% are not necessary; and, usually, amounts appreciably greater than 0.05% will produce such rapid initial reaction rates as to increase the hazards of the reaction and, of course, unnecessarily increase costs. The concentration of the glycol-soluble organic salts of cadmium, magnesium and zinc will depend somewhat on the particular catalyst or catalysts used; an optimum range of concentration is from about 0.005% to about 0.1%, the larger amounts being used in combination with the larger amounts of lithium hydride. It is preferred to employ between 0.02%–0.04% for best performance and least effect upon the color of the polymer resulting from subsequent polymerization of the bis-2-hydroxy-ethyl terephthalate.

The catalysts of this invention may be incorporated or blended into the initial reaction mixture by any suitable expedient. Preferably, the catalysts are employed in finely-divided or powdered form and are dissolved directly in the reaction mixture. Alternatively, the catalysts may conveniently be dissolved in the cold dihydric alcohol, e. g., glycol, which, in turn, may be blended with the hot mixture of the glycol and dialkyl terephthalates.

The ester interchange reaction is carried out at a temperature of from about 110° C. to about 260° C., the exact range in each instance depending upon the amount and combination of catalysts used and upon the mol ratio of reactions employed. From the standpoint of economy of operation, it is desirable to carry out the reaction in the shortest practicable time with a minimum heat input. Accordingly, the minimum temperature employed will be the lowest temperature at which reaction takes place at a satisfactorily rapid rate; and the maximum temperature will be the temperature necessary to carry the reaction to completion and effect complete removal of monohydric alcohol, e. g., methanol, from the reaction mixture. An outstanding characteristic of the catalyst combinations of this invention is that they cause the reaction to proceed rapidly at low temperatures; i. e., in general, the reaction is 60–65% complete in ten minutes at temperatures of from 110°–165° C. Using the catalysts herein, the ester interchange reaction is preferably initiated and carried to completion at atmospheric pressure. It is possible to carry out the reaction under pressures either lower or higher than atomspheric but, in general, this is not necessary and merely adds to the cost of operation.

While the ester interchange reaction may be carried out batchwise, the catalyst combination of lithium hydride with the other specified ester interchange catalysts is particularly adapted to processes wherein the ester interchange is carried out continuously. For example, an ester interchange reaction between ethylene glycol and dimethyl terephthalate was carried out in a cylindrical tower comprising a number of individually heated plates. On top of the tower was a reflux condenser maintained at about 65° C. (the boiling point of methanol). The top plate which was just beneath the reflux condenser was maintained about 160–170° C. A solution of dimethyl terephthalate in ethylene glycol was introduced at the top plate in a single stream, and a catalyst composition comprising lithium hydride and zinc acetate dissolved in glycol was introduced as a separate feed. The plate below the top plate was maintained at a slightly higher temperature, and each plate below the one above was at a higher temperature. The reboiler at the bottom of the column was maintained at a temperature of about 250° C. Owing to the high activity of the catalyst at a temperature 160–170° C., a substantial amount of methanol was liberated at the top plate and this methanol immediately vaporized into the condenser at the top of the ester interchange column. Along with the vaporous methanol, a certain amount of ethylene glycol and dimethyl terephthalate also vaporized into the reflux condenser. If the top plate temperature were maintained at a higher temperature, larger amounts of glycol and dimethyl terephthalate would vaporize into the reflux condenser. Such conditions would eventually result in appreciable clogging of the reflux condenser with sublimed dimethyl terephthalate, and it is essential to maintain the top plate at a temperature below about 170° C. to avoid this. Hence, by employing a catalyst which is highly active at such lower temperatures, the top plate may be maintained at 160–170° C.; and the amount of reflux is reduced as compared with that which would occur if the top plate were required to be at a higher temperature to activate the catalyst. By this process, monomeric ethylene glycol terephthalate can be continuously and economically produced.

The ester interchange reaction is usually the first step in the preparation of a polymeric polymethylene glycol terephthalate; and the polymerization step must be carried out under reduced pressure in the vicinity of 0.05–20 mm. of mercury, 0.05–5.0 mm. being preferred for optimum results. Reduced pressure is necessary to remove the free glycol which emerges from the polymer as a result of the condensation reaction, since the reaction mixture is very viscous. A temperature between about 230–290° C., and preferably between 260–275° C., should be maintained during the polymerization step. For continuous production of polyester from the monomers, i. e., from a glycol and an alkyl terephthalate, polymerization catalysts may conveniently be introduced into the reaction mixture with the present combination of ester interchange catalysts. In some instances, polymerization catalysts will somewhat reduce the effectiveness of the ester interchange catalysts. However, even though some catalysts which are highly effective for polymerization tend to retard the effectiveness of the catalysts herein, the use of such polymerization catalysts is generally required to provide for a minimum overall cycle, that is, ester interchange and polymerization.

The following examples, wherein are set forth preferred embodiments, further illustrate the practice and principles of my invention. In all examples, the following procedure was employed with the results illustrated in the graphs of the accompanying drawings:

The ester interchange reactions are carried out in a 1-liter flask fitted with an 18" glass fractionating column (2" in diameter) packed with ⅜" glass rings, and the fractionating column was fitted with a side take-off condenser. The flask was heated electrically, and the amount of heat to the flask was controlled by varying the power input. In all cases, 242 grams of dimethyl terephthalate were reacted with 180 cc. of ethylene glycol. A homogeneous mixture of glycol and dimethyl terephthalate was made by blending these materials at a temperature between 135–150° C. Dimethyl terephthalate melts at about 140° C. The concentration of the catalytic materials employed was based upon the weight of dimethyl terephthalate, and in all cases, the catalyst was added directly to the blend of glycol and dimethyl terephthalate. The methanol liberated during the ester interchange reaction was collected in a graduate, and the amount of methanol collected was recorded at various time intervals. The theoretical amount of methanol was 100 cc., and the reaction was complete when this amount was collected. At the same time intervals, the temperature of the reaction liquid was also measured. The heat input to the flask was varied in order to maintain a temperature of about 65° C. (the boiling point of methanol at atmospheric pressure) at the top of the fractionating column. For each catalyst, the amount of methanol collected was plotted against the elapsed time and the temperature of the reaction liquid at that time. These data are plotted in graph form in Figures 1–13, inclusive.

Example I

Following the procedure just outlined, a combination of 0.01% lithium hydride and 0.04% of zinc acetate was used as catalyst. From the plot of time versus cc. of methanol collected, Figure 1, it is shown that the initial rapid rate of reaction is maintained as the temperature rises above about 165° C. up to about 80% completion. With this catalyst combination, the total time for ester interchange was about 28 minutes.

Example II

Figure 2:
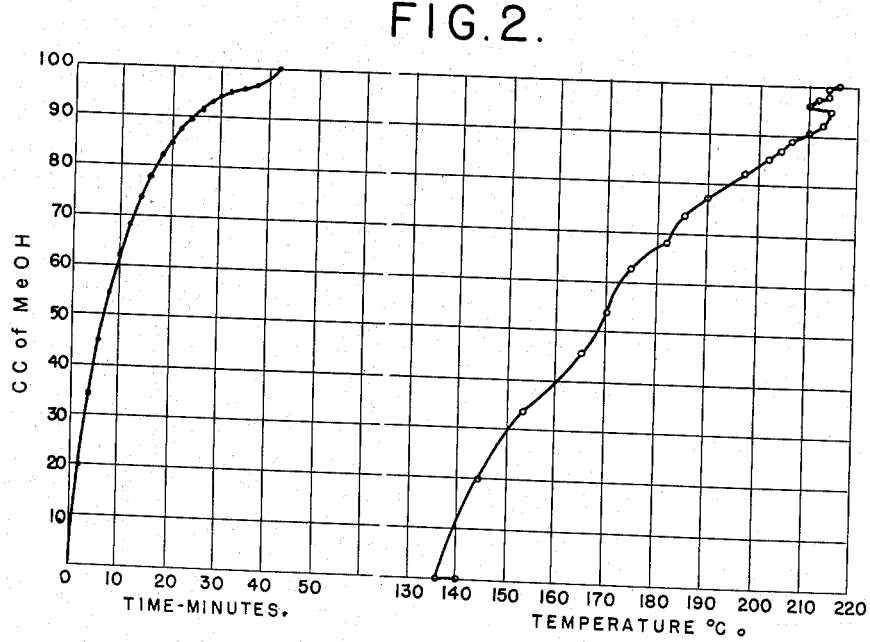

In this example, 0.006% of lithium hydride was combined with 0.05% of magnesium stearate, and the reaction was initiated at 140° C. and completed at 215° C. with the results shown in Figure 2.

Example III

Figure 3:
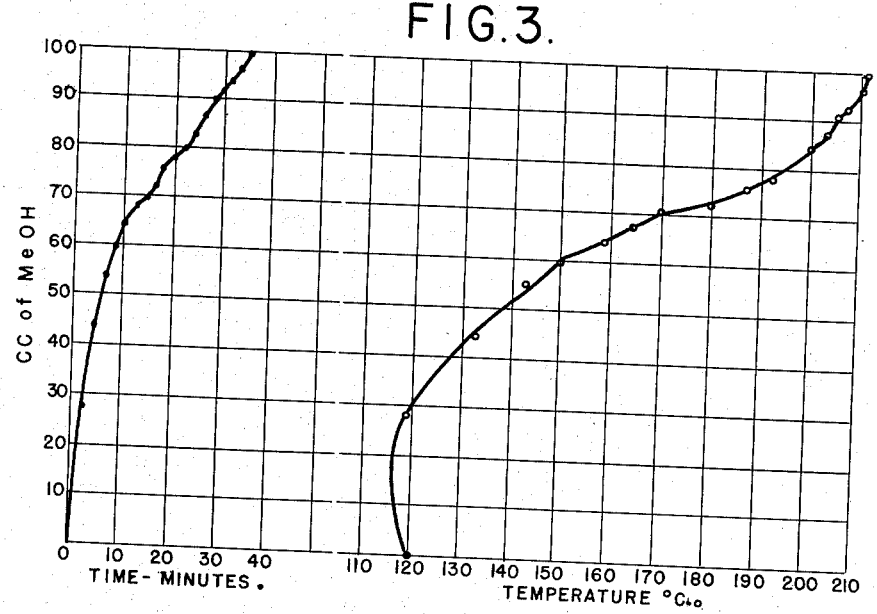

Following the procedure of the previous examples, ester interchange between glycol and dimethyl terephthalate was carried out in the presence of 0.006% lithium hydride and 0.02% of zinc lactate as catalysts. As shown in Figure 3, the initial reaction temperature was 120° C.; and the reaction was 100% completed in 35 minutes at a final temperature of 212° C.

Example IV

Figure 4:
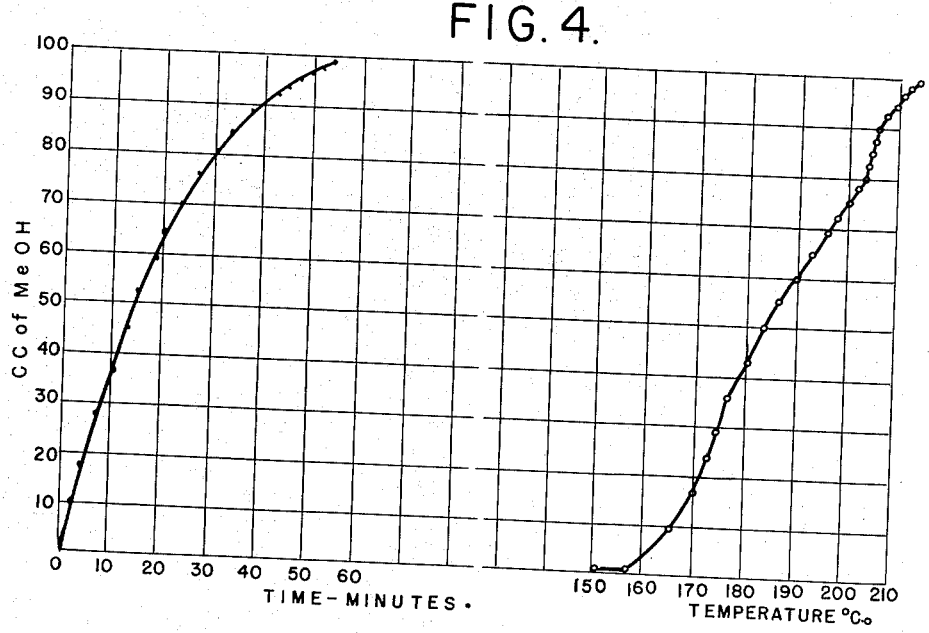

Following the procedure of the previous examples, ester interchange between glycol and dimethyl terephthalate was carried out in the presence of 0.007% lithium hydride and 0.03% of cadmium salicylate as catalysts. As shown in Figure 4, the initial reaction temperature was about 155° C.; and the reaction was substantially 100% completed in 54 minutes at a final temperature of 213° C.

Example V

Figure 5:
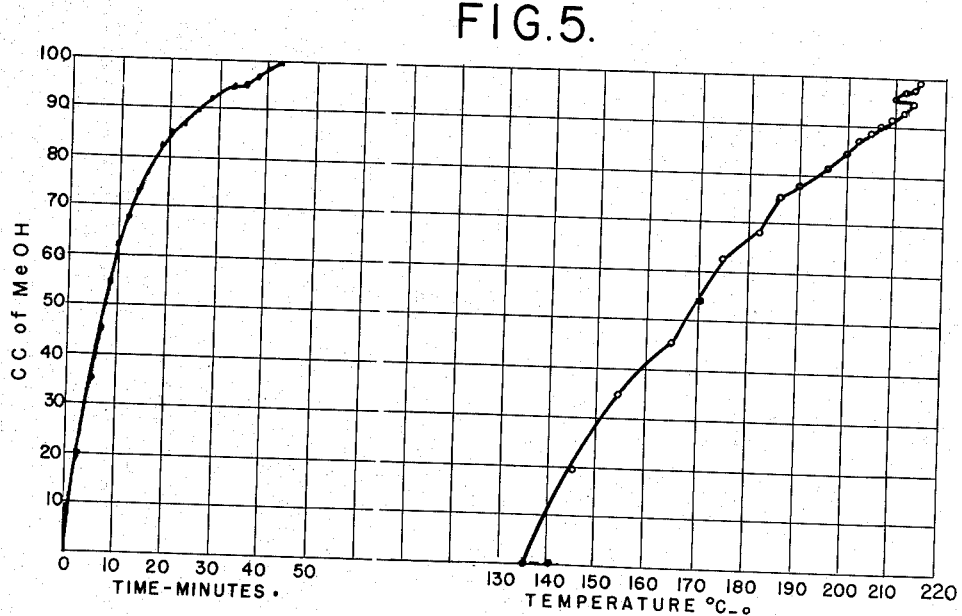
Figure 7:
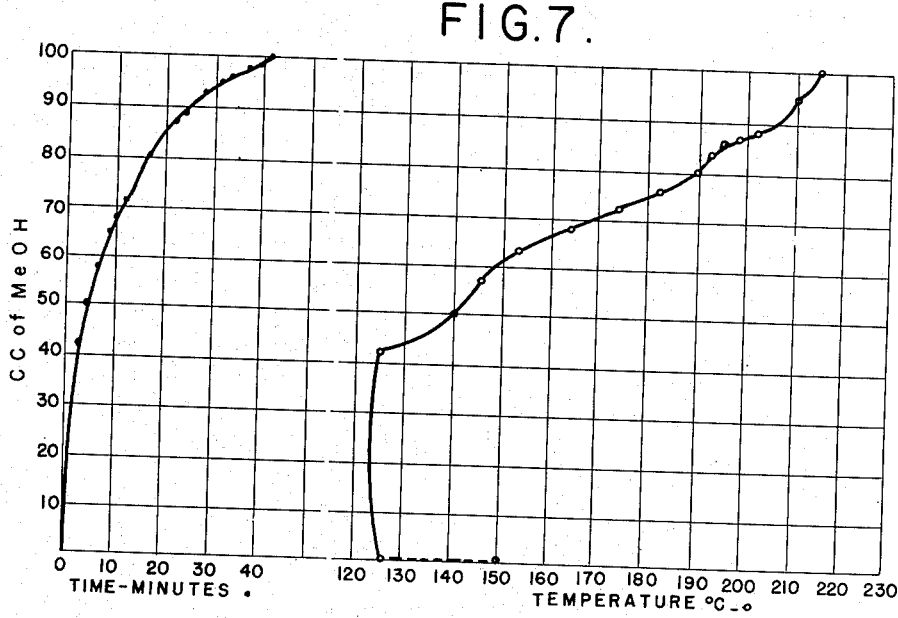

Following the procedure of the previous examples, ester interchange between glycol and dimethyl terephthalate was carried out in the presence of 0.006% lithium hydride and 0.05% magnesium acetate as catalysts. As shown in Figure 5, the initial reaction temperature was 137° C.; and the reaction was 100% completed in 42 minutes at a final temperature of 215° C.

Example VI

Figure 6:
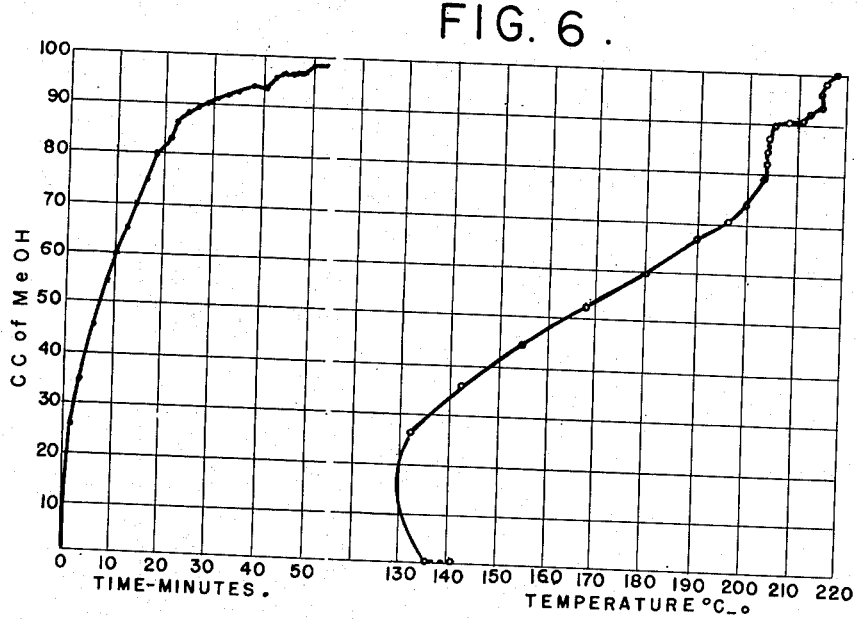
Figure 9:
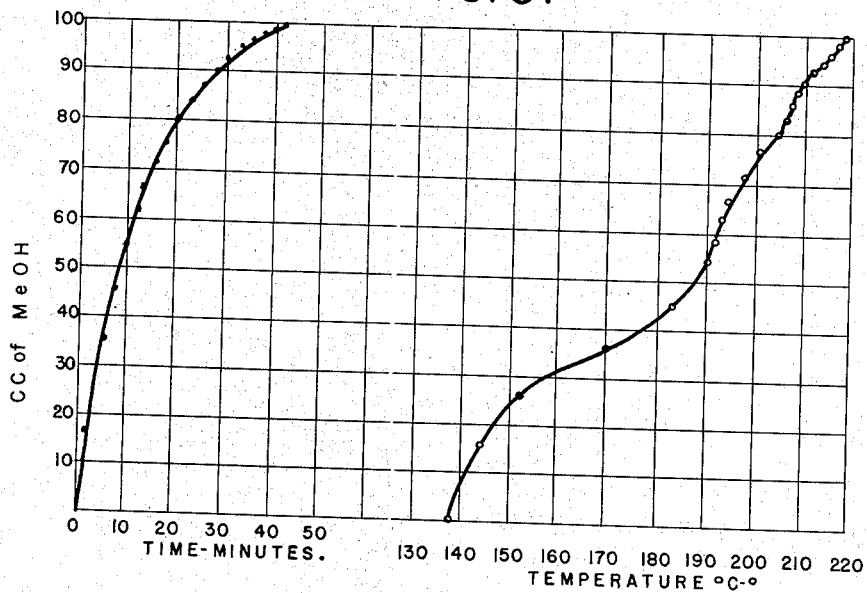

Following the procedure of the previous examples, ester interchange between glycol and dimethyl terephthalate was carried out in the presence of 0.007% lithium hydride and 0.03% of zinc salicylate as catalysts. As shown in Figure 6, the initial reaction temperature was 135° C.; and the reaction was substantially 100% completed in 52 minutes at a final temperature of 215° C.

The following examples illustrate the effect of catalysts useful both as ester interchange and polymerization catalysts when incorporated in the initial reaction mixture with the catalysts of this invention.

Example VII

In this example, the catalyst mixture consisted of 0.01% lithium hydride, 0.02% zinc acetate, and 0.03% of antimony trioxide, the latter being shown and claimed in United States Patent No. 2,641,592 in the name of Charles H. Hofrichter, Jr. It is evident from Figure 7 that antimony trioxide reduces somewhat the effectiveness of the ester interchange catalyst combination.

Example VIII

Figure 8:
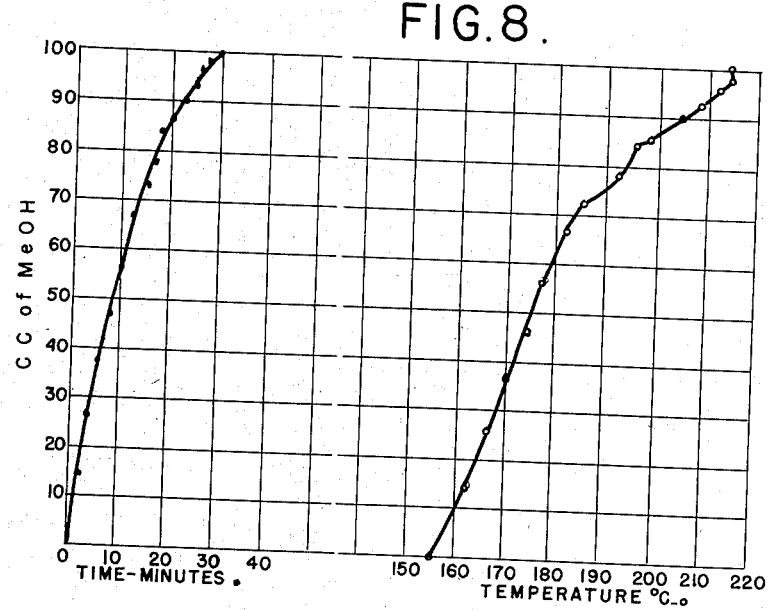

This example illustrates the use of lithium hydride and zinc acetate in combination with another polymerization catalyst; namely, cobaltous acetate United States Patent No. 2,641,592 in the name of Charles H. Hofrichter, Jr. This catalyst is composed of 0.008% lithium hydride, 0.04% zinc acetate, and 0.006% cobaltous acetate. Results are shown in Figure 8.

Example IX

Employing a catalyst combination consisting of 0.005% lithium hydride, 0.02% zinc lactate, and 0.006% cobaltous acetate, United States Patent No. 2,641,592 in the name of Charles H. Hofrichter, Jr., the reaction was carried out as in the preceding examples with the results shown in Figure 9.

The following examples further illustrate the effect of catalysts useful both as ester interchange and polymerization catalysts when incorporated in the initial reaction mixture with the catalysts of this invention. However, the apparatus employed and the charge of raw materials were somewhat different from those used to carry out the experiments illustrated in the previous examples. In the following examples, the ester interchange reactions were carried out in a 500-milliliter flask fitted with a glass fractionating column packed with glass helices; and the fractionating column was fitted with a side take-off condenser. This apparatus was fitted with a temperature controller to regulate the take-off of methanol so that all distillate was returned to the reaction flask when the temperature in the region of take-off rose above 70° C. This regulation of take-off accounts for the regions of constant methanol take-off in the figures accompanying the following examples. In all cases, 155.2 grams of dimethyl terephthalate were reacted with 110 grams of ethylene glycol. For these quantities of the initial reactants, the theoretical amount of methanol was 62 cc. Outside of the foregoing, all other conditions were substantially the same as for Examples I–IX, inclusive.

Example X

Figure 10:
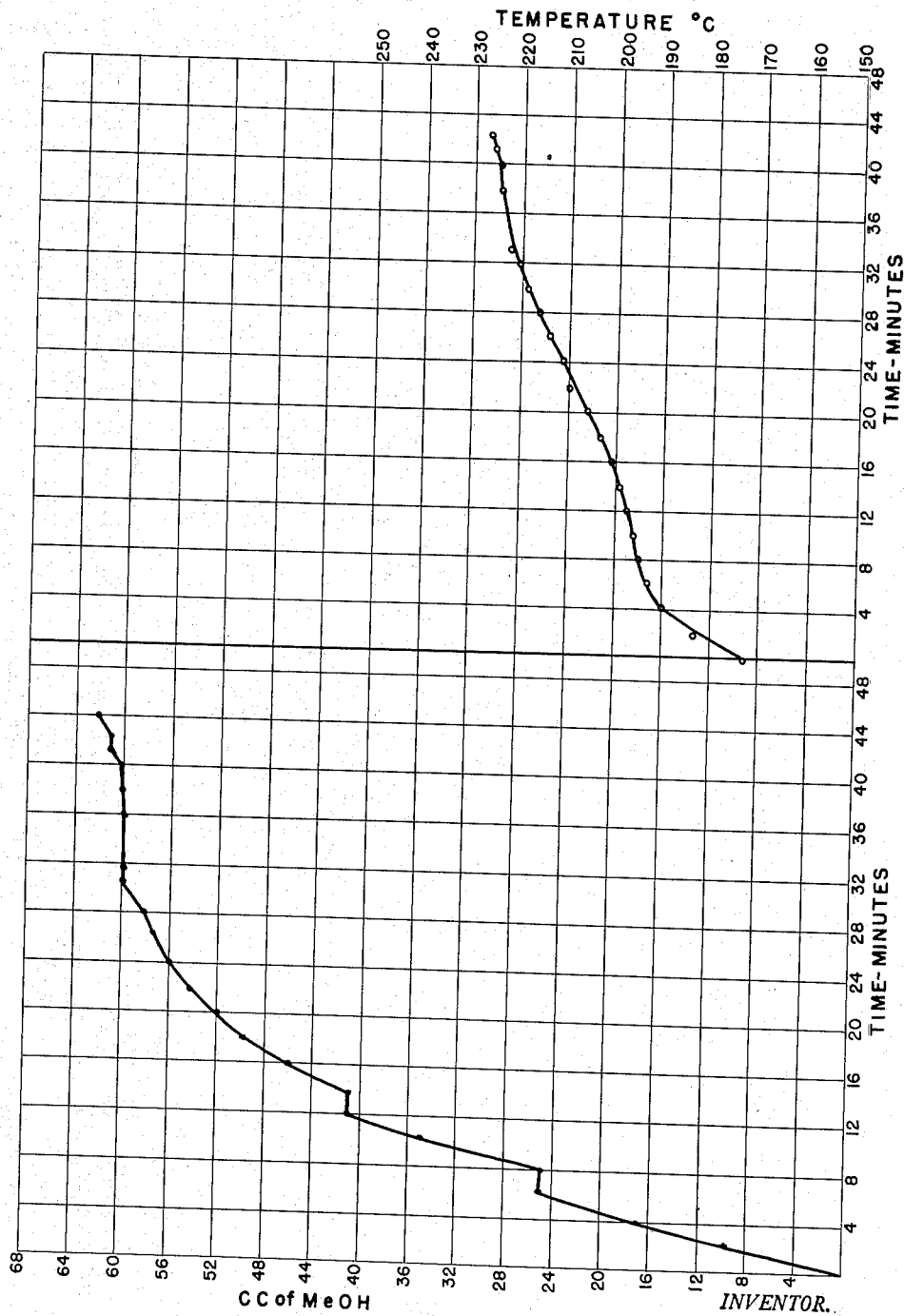

Following the general procedure of the foregoing examples, a combination of 0.007% lithium hydride, 0.035% zinc acetate, and 0.007% cobaltous acetate was used as catalysts. As shown in Figure 10, the initial reaction temperature was 172° C.; and the reaction was substantially 100% completed in 44 minutes at a final temperature of 227° C.

Example XI

Figure 11:
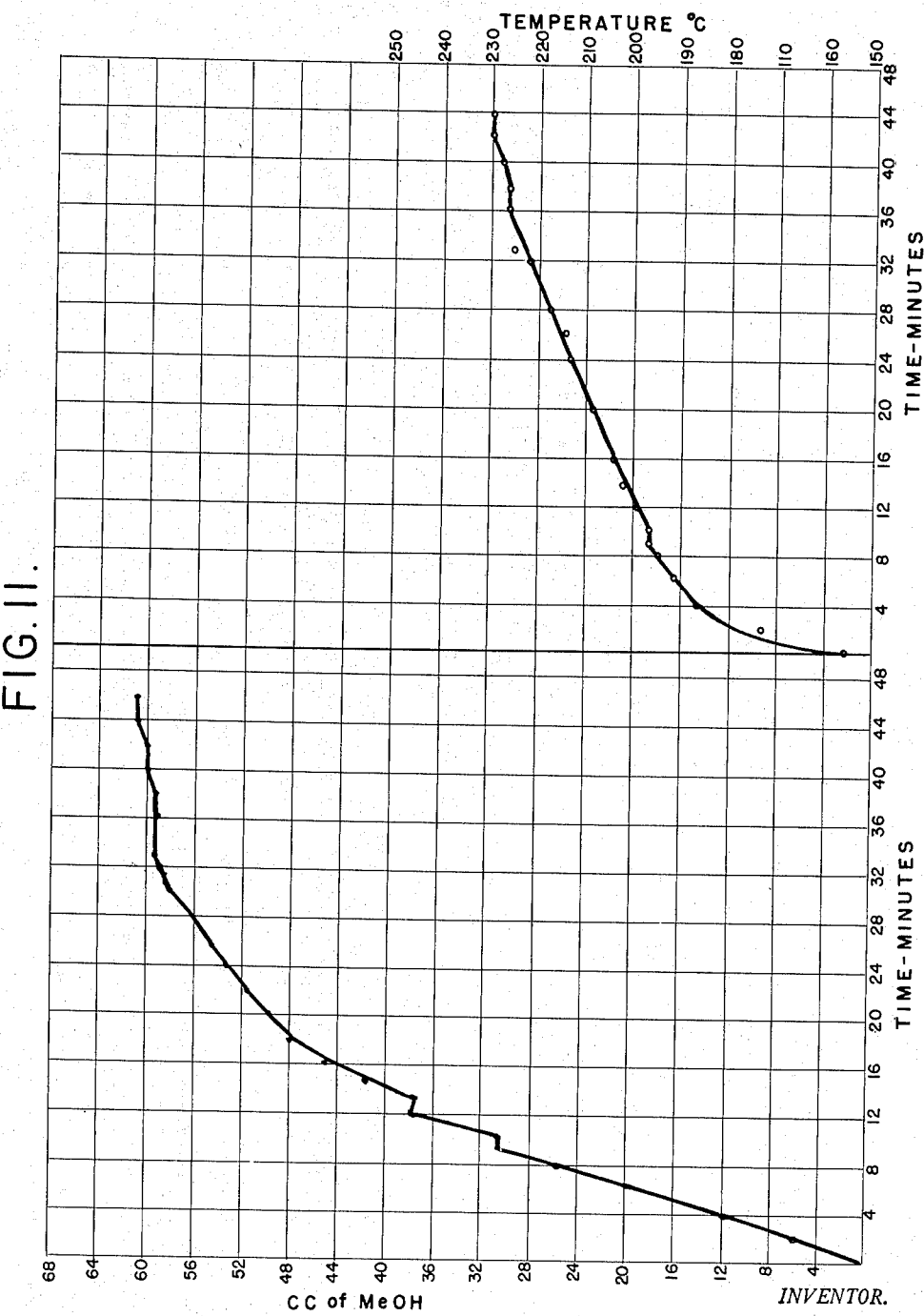

In this example, a catalyst combination consisting of 0.007% lithium hydride, 0.042% cadmium acetate, and 0.007% cobaltous acetate was employed. As shown in Figure 11, the initial reaction temperature was 155° C.; and the reaction was substantially 100% completed in 46 minutes at a final temperature of 230° C.

Example XII

Figure 12:
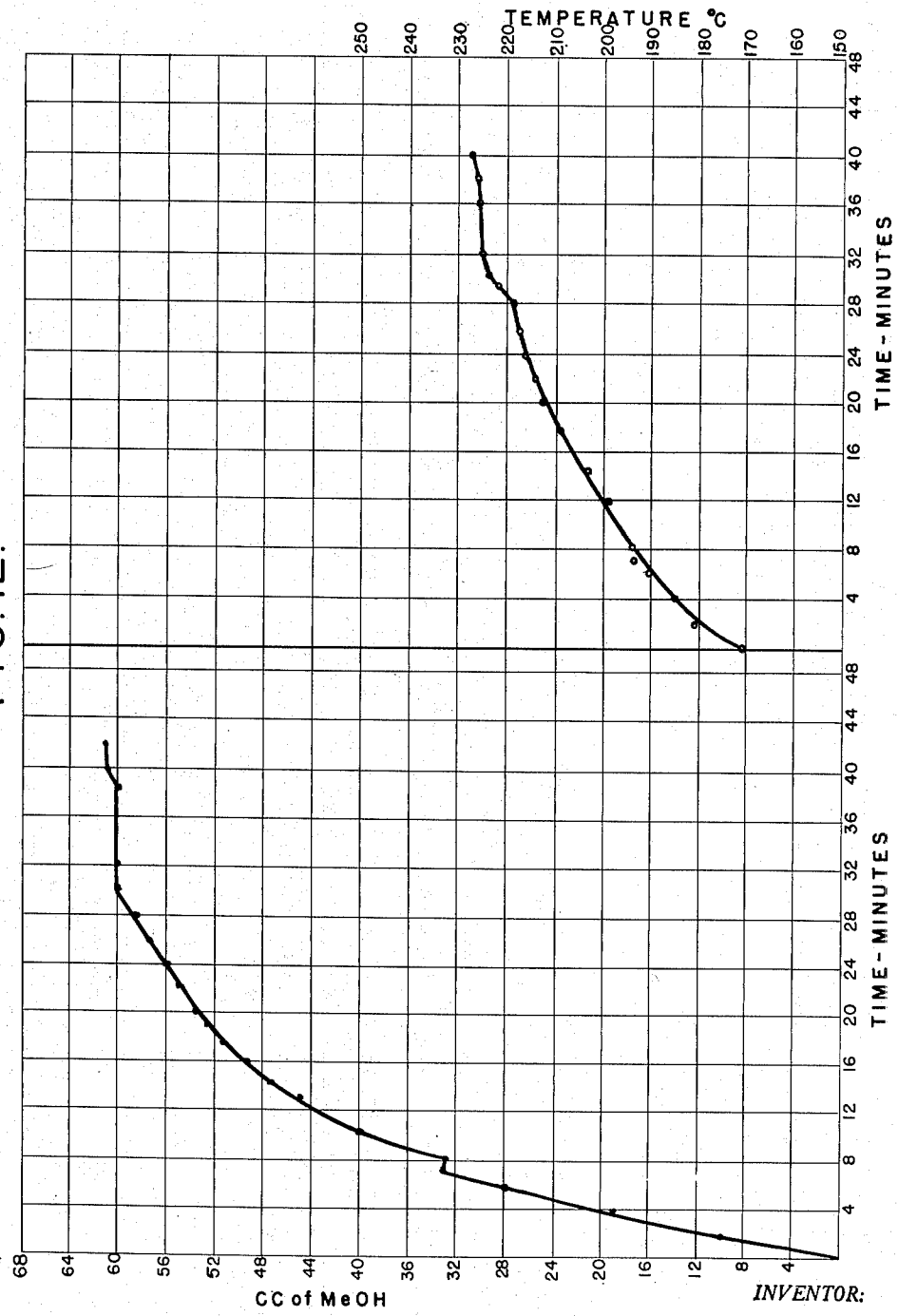

In this example, the catalyst mixture consisted of 0.007% lithium hydride, 0.035% zinc acetate, 0.007% cobaltous acetate and 0.02% antimony trioxide. As shown in Figure 12, the initial reaction temperature was 170° C.; and the reaction was substantially 100% completed in 42 minutes at a final temperature of 226° C.

Example XIII

In this example, the catalyst mixture consisted of 0.007% lithium hydride, 0.042% cadmium acetate, 0.007% cobaltous acetate and 0.02% antimony trioxide, the latter combination being shown and claimed in Hofrichter United States Patent No. 2,641,592. As shown in Figure 13, the initial reaction temperature was 170° C.; and the reaction was substantially 100% completed in 36 minutes at a final temperature of 227° C.

It will be obvious from the foregoing description that the present invention provides a catalyst combination of high efficiency and enables the rapid and economic production of glycol terephthlates. A particular advantage of the present invention resides in feature that the ester interchange reaction can now be carried to completion in short time at atmospheric pressure. A further advantage of the invention is that all of the catalytic materials are obtainable in finely-divided form which permits of easy and rapid incorporation in the reaction mixture. Moreover, the catalysts herein disclosed are all safe to handle and, hence, do not entail the health hazards heretofore encountered by a number of catalyst materials previously proposed for use in ester interchange. Furthermore, the catalysts of the present invention lead to the formation of polymer of excellent color, i. e., substantially colorless.

Since it is obvious that various changes may be made in the matter of details without departing from the broad spirit and scope of my invention, it is to be understood that said invention is in no way restricted save as set forth in the appended claims.

I claim:

1. In the process which comprises reacting a glycol of the formula, $HO(CH_2)_nOH$, where "$n$" is an integer from 2 to 10 inclusive, with an alkyl ester of terephthalic acid having 1 to 4 carbon atoms in the alkyl group under conditions to effect ester interchanges, the improvement which comprises carrying out the ester interchange in the presence of a catalyst mixture comprising lithium hydride and at least one ethylene glycol-soluble organic salt of a metal from the group consisting of cadmium, magnesium and zinc, and an acid from the group consisting of fatty acids containing up to 18 carbon atoms, salicylic acid, and lactic acid.

2. In the process which comprises reacting a glycol of the formula, $HO(CH_2)_nOH$, where "$n$" is an integer from 2 to 10 inclusive, with an alkyl ester of terephthalic acid having 1 to 4 carbon atoms in the alkyl group under conditions to effect ester interchanges, the improvement which comprises carrying out the ester interchange in the presence of a catalyst mixture comprising lithium hydride and at least one ethylene glycol-soluble metal salt of a metal selected from the group consisting of cadmium, magnesium and zinc, and an acid from the group consisting of fatty acids containing up to 18 carbon atoms, salicylic acid, and lactic acid.

3. The process for forming bis-2-hydroxyethyl terephthalate which comprises heating glycol and dimethyl terephthalate at temperatures within the range of from about 110° C. to about 260° C. in the presence of a catalyst mixture comprising lithium hydride and at least one ethylene glycol-soluble metal salt of a metal selected from the group consisting of cadmium, magnesium and zinc, and an acid from the group consisting of fatty acids containing up to 18 carbon atoms, salicylic acid, and lactic acid, and continuing the heating until no more methyl alcohol is evolved.

4. The process of claim 3 wherein the monocarboxylic acid is acetic acid.

5. The process of claim 4 wherein the glycol-soluble metal salt is cadmium acetate.

6. The process of claim 4 wherein the glycol-soluble salt is zinc acetate.

7. A catalyst effective to promote ester interchange comprising a mixture of lithium hydride and at least one ethylene glycol-soluble metal salt of a metal selected from the group consisting of cadmium, magnesium and zinc, and an acid from the group consisting of fatty acids containing up to 18 carbon atoms, salicylic acid, and lactic acid.

8. A catalyst effective to promote ester interchange comprising a mixture of lithium hydride and cadmium acetate.

9. A catalyst effective to promote ester interchange comprising a mixture of lithium hydride and zinc acetate.

References Cited in the file of this patent

UNITED STATES PATENTS

| Number | Name | Date |
| --- | --- | --- |
| 2,483,726 | Floyd | Oct. 4, 1949 |
| 2,558,547 | Eckey | June 26, 1951 |

FOREIGN PATENTS

| Number | Country | Date |
| --- | --- | --- |
| 623,669 | Great Britain | May 20, 1949 |

OTHER REFERENCES

Groggins, Unit Processes of Organic Chemistry (3rd ed. 1947), pp. 635–637.